(12) United States Patent
Curnock et al.

(10) Patent No.: US 7,231,302 B2
(45) Date of Patent: Jun. 12, 2007

(54) AUTOMATED SYSTEM AND METHOD FOR PROVIDING CHEMICAL TREATMENT SOLUTIONS FOR FLUID SYSTEM PROBLEMS VIA STRUCTURED DATA-ENTRY PROCESS

(75) Inventors: Daniel P Curnock, Friendswood, TX (US); Edward W Cocetti, Friendswood, TX (US)

(73) Assignee: ChemCentric L.P., Houston, TX (US)

( * ) Notice: Subject to any disclaimer, the term of this patent is extended or adjusted under 35 U.S.C. 154(b) by 145 days.

(21) Appl. No.: 11/083,427

(22) Filed: Mar. 18, 2005

(65) Prior Publication Data
US 2005/0209807 A1    Sep. 22, 2005

Related U.S. Application Data

(60) Provisional application No. 60/554,136, filed on Mar. 18, 2004.

(51) Int. Cl.
*G06F 19/00* (2006.01)
(52) U.S. Cl. .................................... 702/22; 707/104.1
(58) Field of Classification Search .................. 702/12, 702/19, 22, 23–25, 27, 30, 31, 68, 80, 120, 702/122, 123, 183, 184, 186, 188; 700/236, 700/244; 436/56; 707/104.1

See application file for complete search history.

(56) References Cited

U.S. PATENT DOCUMENTS

| | | | |
|---|---|---|---|
| 5,001,630 A | 3/1991 | Wiltfong | |
| 6,167,383 A | 12/2000 | Henson | |
| 6,507,823 B1 | 1/2003 | Nel | |
| 6,594,638 B1 | 7/2003 | Feldman et al. | |
| 2002/0194089 A1 | 12/2002 | Clifton et al. | |
| 2003/0037062 A1* | 2/2003 | Nisler et al. | 707/104.1 |
| 2003/0236649 A1* | 12/2003 | Kodukula et al. | 702/188 |
| 2004/0039612 A1 | 2/2004 | Fitzgerald et al. | |
| 2004/0073498 A1* | 4/2004 | Breen et al. | 705/27 |
| 2004/0087838 A1* | 5/2004 | Galloway et al. | 600/300 |

* cited by examiner

*Primary Examiner*—Marc S. Hoff
*Assistant Examiner*—Mohamed Charioui
(74) *Attorney, Agent, or Firm*—Wong, Cabello, Lutsch, Rutherford & Brucculeri, LLP

(57) ABSTRACT

An automated system and method provides a user with a chemical treatment solution for a problem with the user's fluid system. The user, who may have an industrial or commercial water treatment problem, uses a structured data-entry process having a plurality of interfaces. With the interfaces, the user can specify the type of system they have, the service their system provides (e.g., heating, cooling, supply or waste water process), the heating or cooling load of their system, the quality of the water source, the evaporative or other losses expected, the throughput, the metallurgy of the piping and other equipment of their system, and the operating conditions of their system. After the data-entry process is complete, the automated system and method recommends a specific water treatment solution uniquely tailored to the needs of the user.

42 Claims, 18 Drawing Sheets

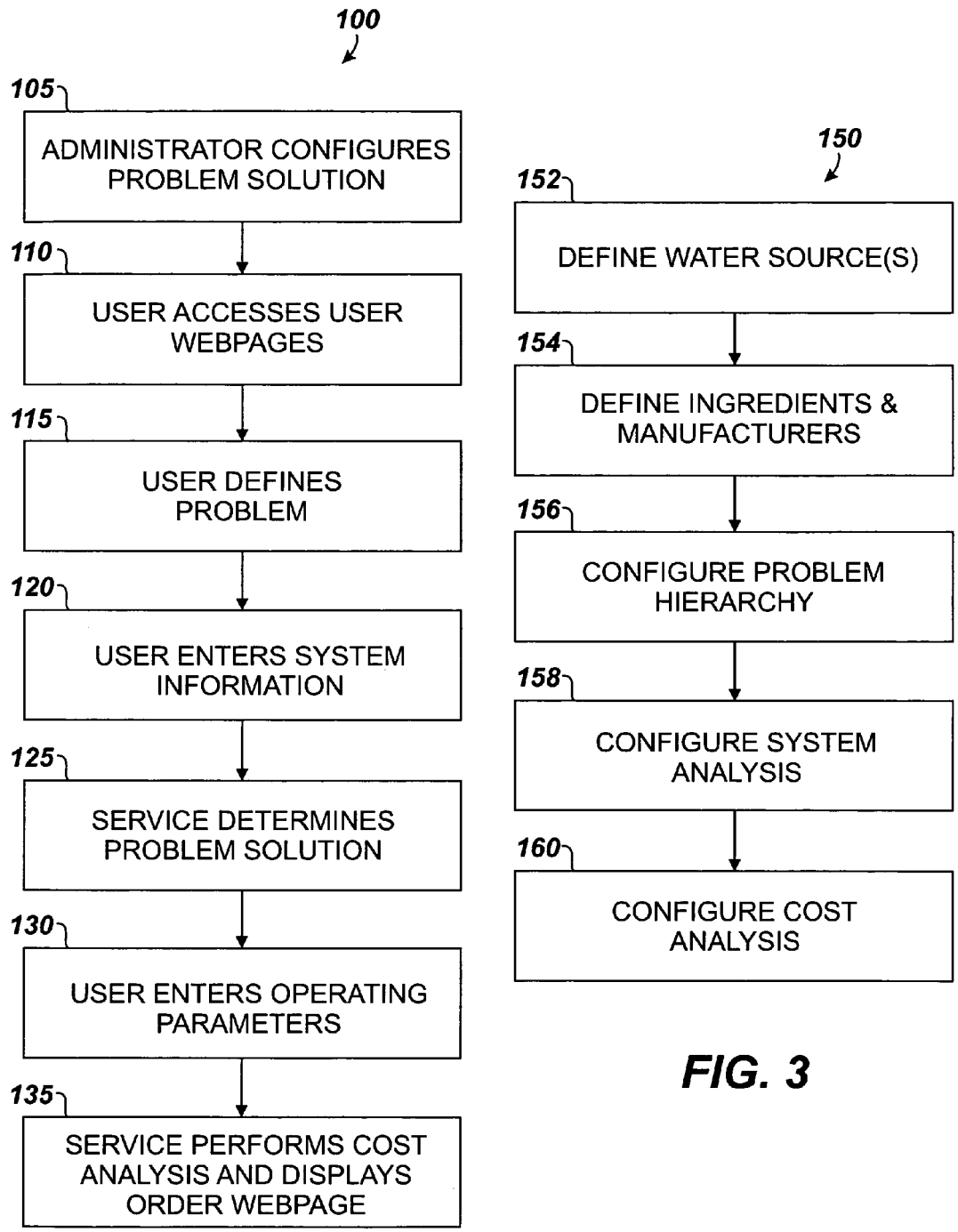

| FILE | EDIT | VIEW | FAVORITES | TOOLS | HELP |

ADDRESS [ ]

CHEMSOLVER™ ADD WATER SOURCE

* WATER SOURCE NAME: [BRAZOS RIVER - TEXAS CITY, TX]
ACTIVE: ☑

CONDITIONS:

* CALCIUM HARDNESS: [160] ppm CaCO3
* CONDUCTIVITY: [650] umhos
* IRON: [1] ppm Fe
* M ALKALINITY: [120] ppm CaCO3
* MAGNESIUM: [40] ppm CaCO3
* PH: [8] pH
* SILICA: [3] ppm SiO2
* TOTAL HARDNESS: [200] ppm CaCO3
* TOTAL SOLIDS: [650] ppm
* TURBIDITY: [50] NTU \* = required field.

[SAVE] [CANCEL]

*FIG. 5*

FILE  EDIT  VIEW  FAVORITES  TOOLS  HELP

ADDRESS [        ]

CHEMSOLVER™ UPDATE BASE FORMULATION CONDITION RESULTS

910 → BASE FORMULATION: COOLING WATER | OPEN RECIRCULATION | CORROSION | GENERAL | CARBON STEEL | CWD-100
912 → CONDITION NAME: MAXIMUM BULK WATER TEMP.

920 → *RESULT NAME: [GREATER THAN 120 DEG F]

922 → *OPERATOR: [>  ▽]

924 → *FORMULA: [119.4]

926 →

INSERT INPUT: [% YELLOW METALS IN SYS.  ▽]  [<INSERT]

INSERT WATER SOURCE CONDITION: [CALCIUM HARDNESS  ▽]  [<INSERT]

INSERT FORMULA: [ABS  ▽]  [<INSERT]

930 → [SAVE]  [CANCEL]

* = required filed.

*FIG. 9*

CHEMSOLVER™ UPDATE ANNUAL COST

1110 → BASE FORMULATION: COOLING WATER | OPEN RECIRCULATION | CORROSION | GENERAL | CARBON STEEL | CWD-100

1120 →* ANNUAL COST NAME: PRODUCT COST

1122 → ANNUAL COST UOM: $/DAY

1124 →* FORMULA: ProductCostDay [<opRecirculationRateop>, <opDeltaTempop>, <ctCyclesct>, <bfPPMProduct>, <bfSalesPricebf>]

1126 → INSERT INPUT: % YELLOW METALS IN SYS. ∨ <INSERT

INSERT WATER SOURCE CONDITION: CALCIUM HARDNESS ∨ <INSERT

INSERT OPERATING PARAMETER: DELTA TEMP. (RETURN-SUPPLY) ∨ <INSERT

INSERT CONTROL TARGET: CALCIUM ∨ <INSERT

INSERT MIN/MAX TARGET: CALCIUM MAX ∨ <INSERT

INSERT BASE FORMULATION VALUE: PPM PRODUCT ∨ <INSERT

INSERT FORMULA: ABS ∨ <INSERT

* = required filed.      1130 → SAVE   CANCEL

CHEMSOLVER™ CONFIGURATION

PROBLEM
SELECT A PROBLEM: CW PITTING CORROSION TEST 8/31 11:20AM

CASE
1420 — SELECT CASE: CASE 1
WATER SOURCE: BRAZOS RIVER - TEXAS CITY, TX — 1430

APPLICATION AREA
1440 — ● COOLING WATER
○ RAW WATER PRETREATMENT

APPLICATION TYPE
1450 — ● OPEN RECIRCULATING

PROBLEM AREA
1460 — ● CORROSION
○ DEPOSITION

PROBLEM TYPE
○ GENERAL
● PITTING — 1470

PROBLEM METALLURGY
● CARBON STEEL — 1480

BACK    NEXT — 1490

FILE  EDIT  VIEW  FAVORITES  TOOLS  HELP

⇦ ⇨ ADDRESS [                    ]

CHEMSOLVER™ SYSTEM INFORMATION ENTRY

PROBLEM DEFINITION SUMMARY

PROBLEM: CW Pitting Corrosion Test 8/31 11:20am
CASE: Case 1
WATER SOURCE: Brazos River - Texas City, TX
APPLICATION TYPE: Open Recirculating
PROBLEM AREA: Corrosion
PROBLEM TYPE: Pitting
PROBLEM METALLURGY: Carbon Steel

SYSTEM INFORMATION ENTRY

\* % YELLOW METALS IN SYSTEM: [    ] %   ○ YES   ○ NO
\* CLARIFIED MAKE-UP WATER: [    ]   ○ YES   ○ NO
\* MAXIMUM BULK WATER TEMPERATURE: [    ] DEGREES F
\* PH CONTROL:   ○ YES   ○ NO

ADDITIONAL SYSTEM INFORMATION

SUPPORT FILES: (None)
Add/Delete Support Files...

ADDITIONAL INFORMATION: [                    ]

FILE  EDIT  VIEW  FAVORITES  TOOLS  HELP

⇐ ⇒ ADDRESS [        ]

CHEMSOLVER™ OPERATING PARAMETERS ENTRY FOR COST CALCULATOR

PLEASE ENTER OPERATING PARAMETERS, SELECT BLENDING & PACKAGING AND CASES TO CALCULATE AND CLICK "CALCULATE COST" AT THE BOTTOM OF THIS PAGE.

OPERATING PARAMETERS ENTRY
CASE 1:

* Delta Temperature (Return-Supply): [22] degrees F
* Recirculation Rate: [40000] ggpm
* Blending & Packaging: [55 gallon drums ▼]
Include Case 1 In Cost Calculation: ○

PROBLEM CASE: CW PITTING CORROSION TEST 8/31 11:20AM
SYSTEM INGREDIENTS SUMMARY

| Case 1: ChemSolver CWD-100 - Cooling Water Dispersant Ingredients | % PPM Active In System |
|---|---|
| Acumer 2000 | 2.0 |
| ChemSolver CWI-100 - Cooling Water Corrosion and Scale Inhibitor Ingredients | % PPM Active In System |
| Acumer 4210 | 3.0 |
| Bricorr 288 | 4.0 |
| EDTA | 0.2 |
| HEDP | 2.0 |
| KOH | 8.0 |

FIG. 17

AUTOMATED SYSTEM AND METHOD FOR PROVIDING CHEMICAL TREATMENT SOLUTIONS FOR FLUID SYSTEM PROBLEMS VIA STRUCTURED DATA-ENTRY PROCESS

CROSS-REFERENCE TO RELATED APPLICATIONS

This application claims the benefit of U.S. Provisional Application Ser. No. 60/554,136, filed Mar. 18, 2004 and entitled "System and Method for On-Line Selection and Custom Configuration of Water Treatment Chemicals for Commercial and Industrial Applications," which is incorporated herein by reference in its entirety.

FIELD OF THE DISCLOSURE

The subject matter of the present disclosure relates generally to an automated system and method for providing chemical treatment solutions to fluid system problems via a structured data-entry process and relates more particularly to a solution service having an Internet website for providing chemical treatment solutions for problems of water systems via structured user interfaces.

BACKGROUND OF THE DISCLOSURE

Many different commercial and industrial fluid systems can have problems with turbidity, corrosion, scaling, deposition, biological fouling, etc. Various chemical solutions can be used to treat and reduce such problems in fluid systems. Currently, a purchaser of treatment chemicals must consult chemical selection guides to find a chemical treatment that may solve a particular problem they have encountered with their fluid system. Unfortunately, chemical selection guides typically present a limited number of situations where problems are encountered. In addition, the selection guides cannot be readily updated and are not automated. Therefore, the purchaser using the selection guides may purchase chemicals that are not well-tailored to their needs due to the overall complexity of treatment problems.

Companies offering chemical treatments for fluid systems have been striving to provide customers with improved services. To provide better service, the companies have relied primarily on greater access to sales persons and technical personnel familiar with various chemical treatments appropriate for particular problems encountered by purchasers. For example, a sales person questions a customer about the customer's system and problem. The questions elicit specific information about the system, such as the type of system, the service the system provides (e.g., heating, cooling, or supply water), the heating or cooling load, the quality of the water supply, the evaporative or other losses expected, the throughput, the metallurgy of the piping and other equipment in the system, and the operating conditions of the system. After eliciting the information from the purchaser, the sales person performs an analysis. For example, the sales person may consult a selection guide or the like to determine which treatment chemicals are best-suited to address the customer's problem. Unfortunately, the availability of sales persons can be limited, and the sale persons are required to know about a number of fluid systems, problems, solutions, chemicals, prices, formulas, etc. Furthermore, the chemical treatment industry has traditionally recommended treatment chemicals within a portfolio of standard off-the-shelf proprietary chemicals, which are often not uniquely tailored to a purchaser's requirements.

Therefore, a need exists for an automated solution system having a structured data-entry process that allows a user with a fluid treatment problem to find a specific chemical treatment solution uniquely tailored to the needs of the prospective purchaser. The subject matter of the present disclosure is directed to overcoming, or at least reducing the effects of, one or more of the problems set forth above.

SUMMARY OF THE DISCLOSURE

An automated system and method provides a user with a chemical treatment solution for a problem with their water system. The user, who has an industrial or commercial water treatment problem, uses a structured data-entry process of a plurality of interfaces. With the interfaces, the user can specify the type of system they have, the service their system provides (e.g., heating, cooling, supply or waste water process), the heating or cooling load of their system, the quality of the water source, the evaporative or other losses expected, the throughput, the metallurgy of the piping and other equipment of their system, and the operating conditions of their system. After the data-entry process is complete, the automated system or method recommends a specific water treatment solution uniquely tailored to the needs of the user The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 2 illustrates a flowchart showing acts performed by the disclosed solution service to solve a problem a user has encountered with their water system.

FIG. 3 illustrates a flowchart showing acts performed by an administrator of the solution service.

FIG. 5 illustrates an embodiment of an interface for adding a water source to the solution service.

FIG. 9 illustrates an embodiment of an interface for adding base formulation condition results.

FIG. 11 illustrates an embodiment of an interface for adding annual cost for a selected base formulation.

FIG. 14 illustrates an embodiment of an interface for the user to define or configure their problem in the solution service.

FIG. 15 illustrates an embodiment of an interface for the user to enter information about their system.

FIG. 17 illustrates an embodiment of an interface for the user to enter operating parameters of their system for calculating costs of the problem solution ingredients.

Figure 1:
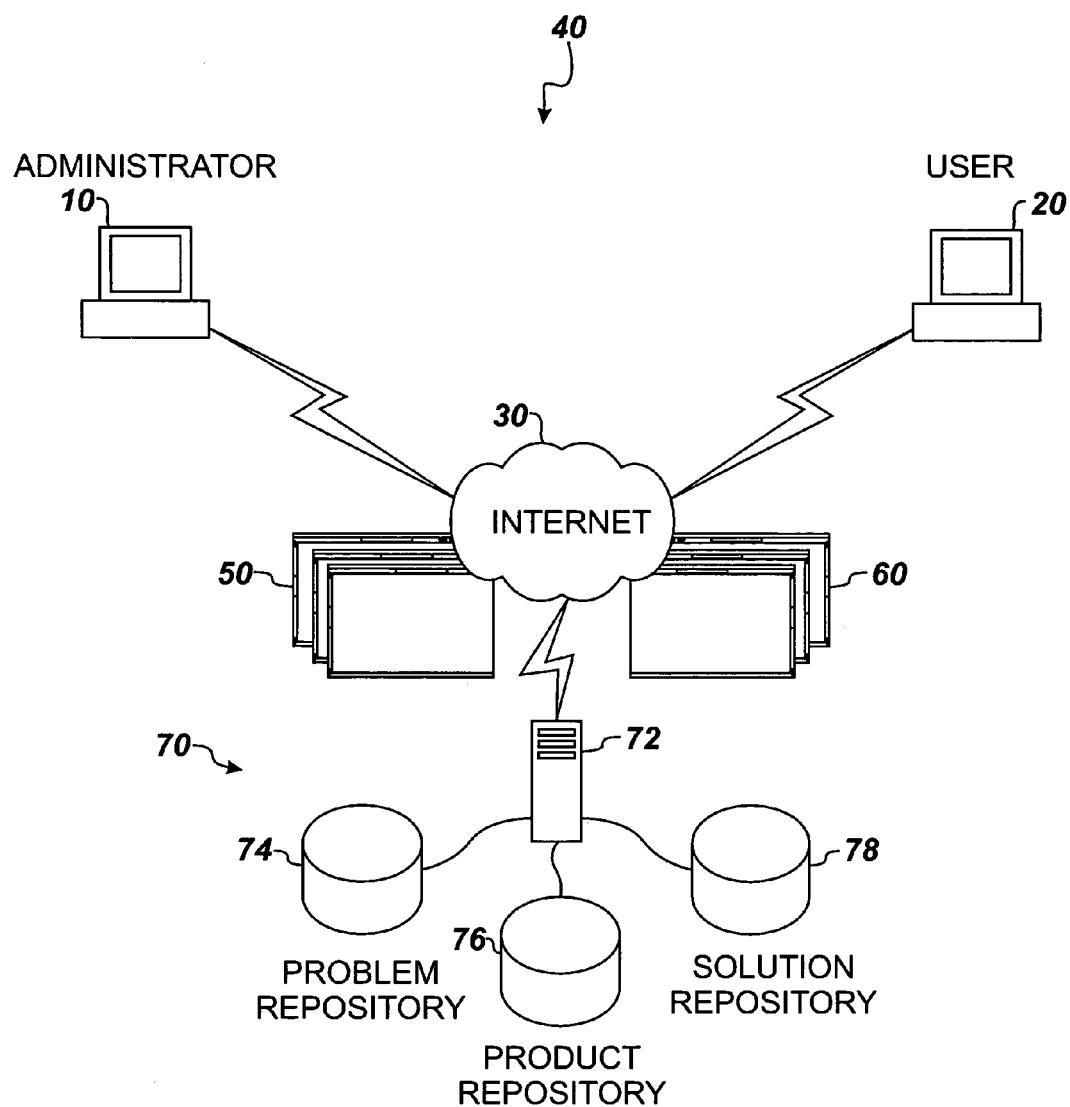
FIG. 1 illustrates an embodiment of an automated solution service for providing solutions to chemical problems via the Internet according to certain teachings of the present disclosure.

While the disclosed system and method are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 1, an embodiment of an automated system 40 according to certain teachings of the present disclosure is schematically illustrated. The system 40 provides users with chemical treatment solutions for their fluid systems via the Internet. The system 40 includes a chemical solution service 70, which has a server 72 and repositories 74, 76, and 78, which are stored on one or more databases associated with the server 72. The server 72 is connected to the Internet 30 via conventional techniques, and the solution service 70 hosts an Internet website at server 72.

Using a computer having a web browser, an administrator 10 and a user 20 have access to the website of the solution service 70 hosted at the server 72 via the Internet 30. The administrator 10 is a person who has high-level access to the solutions service 70 and who handles one or more accounts with the solution service 70. The user 20 is a person who has an account with the solution service 70 and who has low-level access to their account. For example, the administrator 10 can be a technician at the solution service 70, or the administrator 10 can be a salesman at a chemical company having an account at the solution service 70. For example, the user 20 can be a customer, such as an engineer or plant manager of a fluid system.

The administrator 10 uses various administrator interfaces or webpages 50 hosted at server 72 to configure interfaces or webpages 60 for access by the user 20. When configuring the user interfaces 60, the administrator defines various problems associated with fluid systems and stores the problems in a problem repository 74. In addition, the administrator 10 defines chemical constituents or ingredients for treating problems with fluid systems and stores information on the chemical ingredients in the product repository 76. Furthermore, the administrator 10 defines base formulations for storage in the solution repository 78. The base formulations include various chemical ingredients stored in the product repository 76. The base formulations are intended to treat the fluid system problems in the problem repository 74, and the base formulations form the basis for solving actual problems a user 20 may have with their fluid system.

The users 20, on the other hand, are engineers, plant managers, or the like who access the solution service 70 to solve problems they have encountered with their fluid system. To find a chemical treatment solution that fits their needs, the user 20 accesses the pre-configured interfaces or webpages 60 hosted at server 72 and enters information about their fluid system and the problem they have encountered. A typical solution for a water system involves adding various chemicals to the system to prevent or reduce the problem identified by the user. Information on a plurality of problems for various fluid systems is stored in the problem repository 74. Information on a plurality of chemical ingredients for treating various water system problems is stored in the product repository 76. Information on a plurality of base formulations for treating various water system problems is stored in the solution repository 78. The information in the repositories 74, 76, and 78 is organized according to Application Areas, Application Types, Problem Areas, Problem Types, Problem Metallurgies, and Base Formulations, which are discussed in more detail below.

Using a series of webpages 60, the user 20 enters information to define the type of fluid system they have (e.g., a water system) and to define the service their fluid system provides (e.g., heating, cooling, supply, or wastewater). Using the webpages 60, the user 20 also enters operating parameters of their system (e.g., the heating or cooling load of their system, the quality of the water supply, the evaporative or other losses expected, the throughput, the metallurgy of the piping and other equipment of their system, and the operating conditions of their system). Furthermore, using the webpages 60, the user 20 defines the details of the problem they have encounter with their fluid system. For example, the problems can involve corrosion, deposition, and corrosion/deposition problems with the user's system.

Once the solution service 70 receives the information from the user 20, the solution service 70 uses the information entered by the user 20 and information stored in repositories 74, 76, and 78 to automatically determine a solution for the user's problem. In particular, the user-provided information about their system and problem is compared to pre-configured information stored in repositories 74, 76, and 78, which store details of water treatment systems, problems, metallurgies, and base formulations that have provided successful water treatment in similar situations. The base formulations include various chemical ingredients and represent starting points for treating fluid system problems. Depending on the user's particular water treatment problem, individual chemical ingredients are selected for addition or subtraction to or from an appropriate base formulation to create a treatment chemical product specifically tailored to the user's needs. The appropriate chemicals and amounts to be applied to the water system are provided on a user interface or webpage 60, and the user is given the opportunity to purchase the appropriate chemicals from the solution service 70. The solution service 70 can also provides information on support equipment, product pricing, and permits the user to purchase the custom-formulated water treatment chemical from the website.

Referring to FIG. 2, a flowchart shows actions 100 of the disclosed solution service and method according to certain teachings of the present disclosure. The actions 100 begin by the administrator configuring problem solutions in the solution service (Block 102). Configuring the problem solutions involves defining a hierarchy of problems and associated solutions for storage in the solution service. The hierarchy defines how information is obtained from a user and defines what fields, details, and information are included in the user webpages for determining a solution to a fluid treatment problem. Details related to configuring the problem solutions by an administrator are provided below with reference to FIGS. 4A through 12.

After the administrator has configured the problem solutions in the solution service, the user can access the user webpages hosted at the solution service when the user has a problem with their fluid system (Block 110). Using the user webpages, the user defines the problem they have encountered with their system (Block 115). Defining the problem by the user involves selecting an application area, an application type, a problem area, a problem type, and metallurgy from the preconfigured problems solutions stored in the service. Details related to defining the problem by the user are provided below with reference to FIGS. 13 and 14.

After the user has defined the problem, the user enters information about their system (Block 120). Entering information about their system by the user involves defining the inputs, temperatures, controls, etc. of the user's system. Details related to entering information about the user's system are provided below with reference to FIGS. 13 and 15.

With the problem defined and details of the fluid system entered, the solution service determines a problem solution for the user's problem (Block 125). To determine the solution, the service uses the problem definition, system information, base formulations, and global formulas stored in the service. Details on how the service determines the solution are discussed in more detail herein. The service then displays an ingredient summary for the user on a user webpage showing the chemical constituents or ingredients of an appropriate treatment for the user's problem. Details related to displaying the ingredients of a solution to the user are provided below with reference to FIGS. 13 and 16.

To complete the solution, the user enters operating parameters of their system (Block 130). Details related to entering operating parameters are provided below with reference to FIGS. 13 and 17. The service then performs a cost analysis for the chemical constituents of the solution. The user is shown the cost analysis and is able to order the chemicals constituents for the solution using an order webpage (Block 135). Details related to performing the cost analysis and displaying the order webpage are provided below with reference to FIGS. 13 and 18.

Referring to FIG. 3, a flowchart shows actions 150 performed by an administrator of the solution service to configure problem solutions. The administrator can define one or more fluid sources for the fluid system (Block 152). Defining the fluid sources may be left to the user. However, by defining the fluid sources, the administrator can facilitate data entry by the user by making the information already available for commonly used water sources, such as particular rivers, lakes, reservoirs, etc. In defining the fluid sources, the administrator enters measured or known values for characteristics of the fluid source. An embodiment of an administrator interface or webpage for entering information on a water source is disclosed below with reference to FIG. 5.

As shown in FIG. 3, the administrator also defines one or more chemical ingredients or products available for treating problems with fluid systems (Block 154). In defining the chemical ingredients, the administrator lists commercially available treatment ingredients, manufacturers, costs, and properties of the ingredients. These are stored in databases or repositories associated with the solution service. An embodiment of an administrator interface or webpage for entering information on chemical ingredients or products is disclosed below with reference to FIG. 6.

As next shown in FIG. 3, the administrator configures a plurality of solutions to problems associated with various areas and types of fluid systems (Block 156). In configuring the problem solutions, the administrator constructs a hierarchy of options, categories, or tiers for selection by the user. The hierarchy includes base formulations at the lower levels of the hierarchy. The base formulations represent pre-configured solutions to problems in the hierarchy and are reached by the user based on the selections in the hierarchy made by the user when defining their problem and system. The base formulation includes pre-configured chemical ingredients for treating the particular problem of the user. An embodiment of a hierarchy configured by an administrator is disclosed below with reference to FIGS. 4A-4B.

As next shown in FIG. 3, the administrator configures information for analyzing the user's system (Block 156). The analysis information is used by the solution service to re-configuring aspects of the base formulation, such as quantities of the ingredients, so that the re-configured solution is tailored to the user's system. The information required to perform the analysis depends on the problem, the base formulation, and the user's system. Typically, values of the system are required, and calculations are performed to determine the amounts of or the necessity of certain ingredients in the base formulation. Embodiments of administrator interfaces or webpages for configuring information to analyze the user's system are disclosed below with reference to FIGS. 7 through 10.

As next shown in FIG. 3, the administrator configures information for performing cost analysis for the problem solutions (Block 160). The cost analysis uses information entered about particular ingredients and their costs and uses the amounts of ingredients determined in the re-configured formulation calculated by the solution service. Embodiments of administrator interfaces or webpages for configuring information to perform cost analysis are disclosed below with reference to FIG. 11.

Figure 4A:
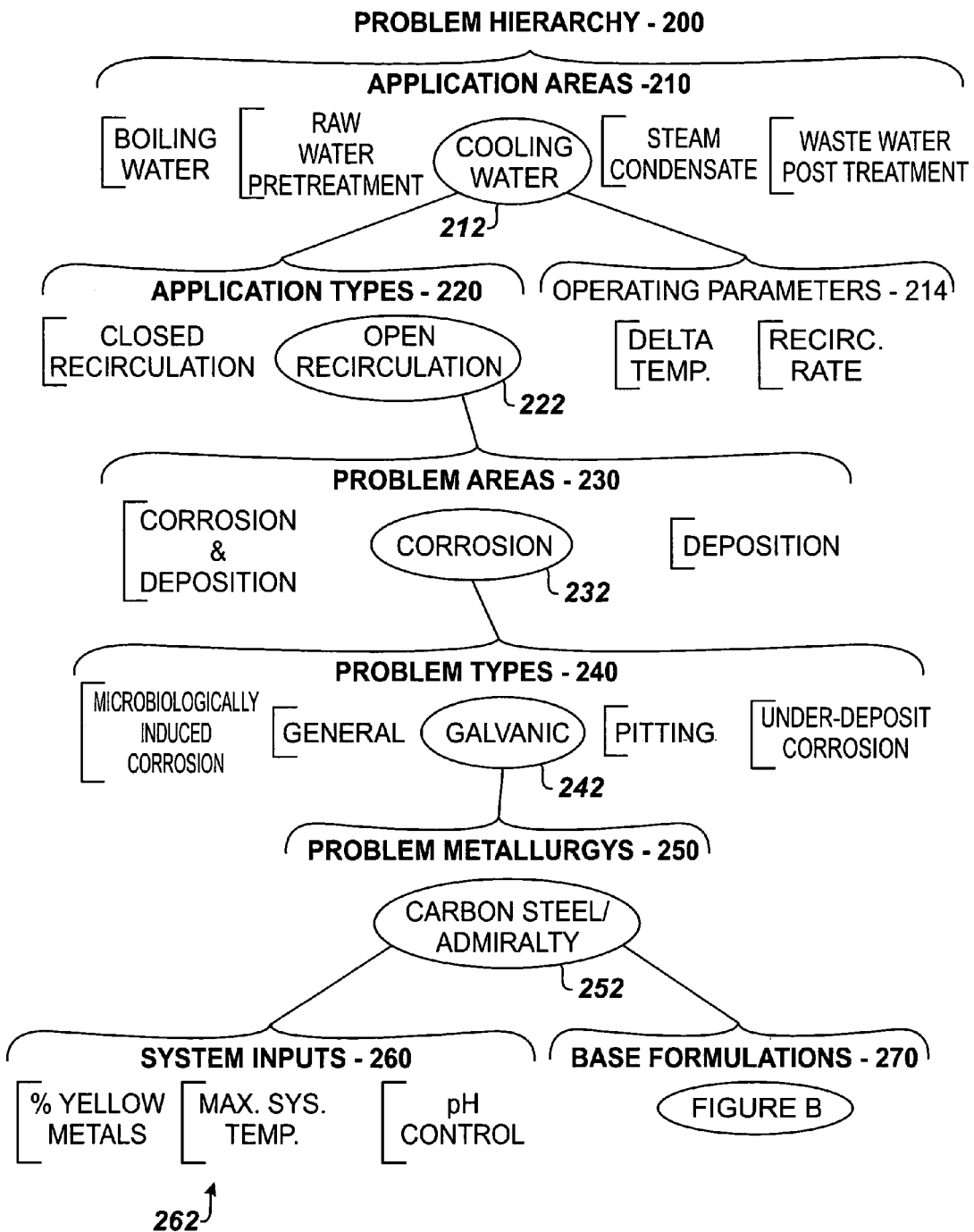
FIGS. 4A-4B illustrate a hierarchy of a solution configured by an administrator.
Figure 4B:
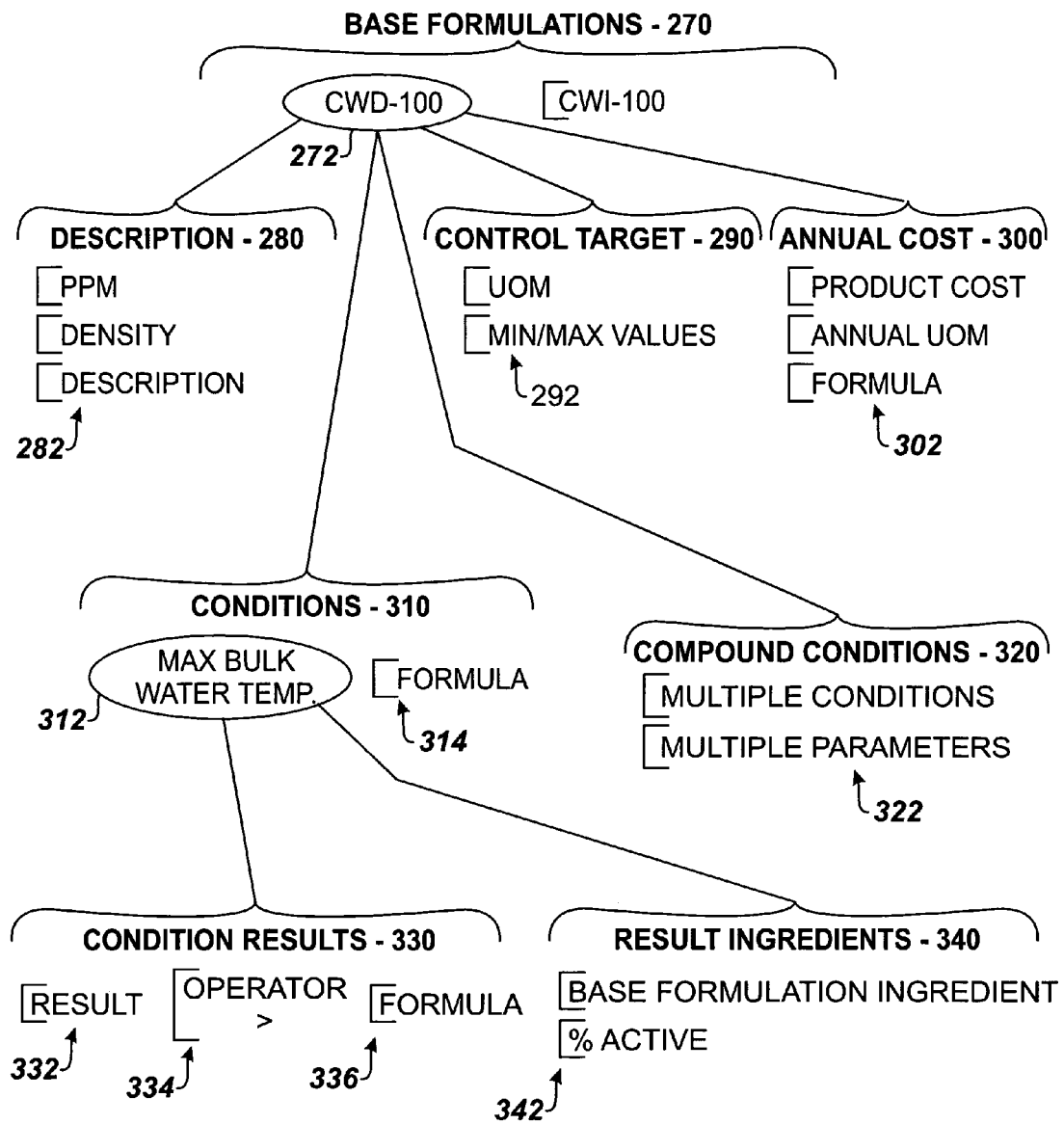

As noted above, the administrator configures a hierarchy of problem solutions for the solution service. Referring to FIGS. 4A-4B, an embodiment of a configured problem solution is schematically illustrated according to certain teachings of the present disclosure. Although the present embodiment is directed to a problem associated with a water system, it will be appreciated that the teachings of the present disclosure are applicable to other types of fluid systems and problems associated with them. As noted above, configuring a problem solution involves defining a hierarchy of problems and associated solutions by the administrator. Using a series of administrator interface or webpages, the administrator constructs the hierarchy, which defines how information is obtained from a user and defines what fields, details, and information are included in the user webpages for determining a solution to a water treatment problem.

The administrator configures a problem solution by building a hierarchy. Portions of the hierarchy will be discussed in turn. Some of these portions will be discussed in more details than others, because some of the portions relate to configuring what information is displayed to a user and how that information is displayed to the user. Configuring such portions of the hierarchy fall within the ordinary skill of one in the art and details are omitted for the sake of brevity. In configuring the solution service for users, the administrator can define relevant details for the users so that when the users access the solution service the user interfaces or webpages are well-tailored to the users' systems and problems.

In configuring a problem solution, the administrator defines a plurality of interrelated tiers, which are categories of options selectable by the user. The tiers include application areas 210, application types 220, problem areas 230, problem types 240, and problem metallurgies 250. Various fluid systems may have these and/or other tiers. In configuring these interrelated tiers 210-250, the administrator constructs the hierarchy of fluid system applications and associated problems. For example, in defining application areas 210, the administrator enters names 212 and operating parameters 214 for one or more application areas. Some example application areas 212 in water systems include boiling water, cooling water, raw water pretreatment, steam condensate, wastewater post treatment. Some example operating parameters 214 include delta temperature (return-supply) and recirculation rate. In defining the application types in tier 220, the administrator enters one or more application types 222 for each area 212 defined in the application area tier 210. Some example application types for the cooling water application area 212 include closed recirculation and open recirculation 222.

In defining problem areas in tier 230, the administrator enters one or more problem areas 232 for each application type 222. Some example problem areas 232 for the cooling water application area 212 with open recirculation 222 include corrosion & deposition (a.k.a. under-deposit corrosion), deposition, and corrosion 232. In defining problem types in tier 240, the administrator enters one or more problem types 242 for each problem area 232. Some example problem types 242 for the cooling water application area 212 with open recirculation 222 and corrosion 232 include general corrosion, microbiologically induced corrosion, pitting corrosion, under-deposit corrosion, and galvanic corrosion 242. In defining metallurgies in tier 250, the administrator enters one or more metallurgies 252 for each problem type 242. An example metallurgy 252 for the cooling water application area 212 with open recirculation 222 and with corrosion 232 that is galvanic 242 includes carbon steel/admiralty 252.

The administrator configures tiers 210 through 250 so that a user can properly define their problem using user interfaces and webpages to arrive at an appropriate solution. FIG. 14 discussed below shows results of configuring the problem solution by the administrator using administrator interfaces to construct tiers 210 through 250.

In configuring the problem solutions, the administrator also configures a tier for system inputs or parameters 260, which depend from the problem metallurgies in tier 250. For example, for the metallurgy 252 of carbon steel/admiralty in tier 250 of hierarchy 200, the system parameters 262 to be requested from the user include the percentage of yellow metals in the system, the maximum system temperature, and the pH control used in the system. Other metallurgies in the hierarchy may have these and/or other system inputs. The system inputs are used to calculate appropriate amounts or additions of ingredients in a base formulation associated with the problem configured in the hierarchy 200. The base formulation will be discussed below.

In configuring the problem solutions, the administrator also configures a tier 270 for base formulations, which depend from each problem metallurgy in tier 250. Referring to FIG. 4B, continued details of the hierarchy and the base formulations are shown. The base formulations 272 are the one or more chemical constituents or ingredients suitable for treating the fluid treatment problem configured in the previous tiers 210 through 250 of the hierarchy 200 shown in FIG. 4A. In the example of FIG. 4B, two base formulations ("CWD-100" and "CWI-100") are shown as solutions for the cooling water application with open recirculation, galvanic corrosion, and carbon steel metallurgy.

For each base formulation 272 in tier 270, the administrator configures a description tier 280, a control target tier 290, an annual cost tier 300, and a conditions tier 310. The description tier 280 is used by the administrator to configure the parts-per-million (PPM), the density, and the description 282 for the base formulation 272. The control target tier 290 allows the administrator to configure the Units of Measure (UOM), maximum value, and minimum values 292 for the base formulation 272 in tier 270. A control target is entered as a guideline for governing the base formulation to which it is associated. The control target optimizes the amounts and ingredients of the resulting problem solution for the user and depends on the hierarchy of the user's problem, the operating parameters, and the base formulation. For example, in a cooling tower application, it may be necessary to control the pH level in the water system to prevent the precipitation of certain minerals and to prevent certain forms of corrosion. By specifying a control target and a maximum and minimum value for the pH level, the administrator can configure the solution service so that the problem solution determined by the service will meet these control targets.

The annual cost tier 300 allows the administrator to configure the product cost, annual unit of measure, and formula 302 for the base formulation 272 in tier 270. These configurations 302 are used to calculate and display the cost of ingredients of the base formulation to the user. The conditions tier 310 allows the administrator to configure the system's conditions that govern the amounts and make-up of the base formulation 272 in tier 270. For example, for the base formulation 272 of "CWD-100" configured for cooling water/open recirculation/corrosion/galvanic/carbon steel metallurgy, the condition governing the base formulation 270 is maximum bulk water temperature 312. A formula 314 is associated with the condition 312. Compound conditions 320 can also depends from the base formulation 272. Because more than one condition can govern the base formulation and can adjust more than one ingredient of the formulation, compound conditions can be configured in tier 320. In this tier 320, a formula can be configured that uses more than one operating parameters to make one adjustment to the base formulation 272 rather than configuring separate formulas for each operating parameter and making multiple adjustments to the base formulation 272.

The tier 330 for condition results depends from the condition 312 or 322. This tier 330 is configured by the administrator to define what result will be applied to the problem solutions based on the condition 312 or 322 defined by the administrator. The result 332 is related to a formula 336 by an operator 34, such as >, <, =, etc. The tier 340 for result ingredients depends for the condition result tier 320. This tier 330 is configured by the administrator to define the one or more chemical ingredients and its percent active in the base formulation. If the result configured in tier 320 is met, the base formulation ingredient in the result ingredient tier 340 forms part of the problem solution for the user. Therefore, the tiers 310-340 are configured to add ingredients to the pre-configured base formulation and/or add or remove amounts of already existing ingredients in the pre-configured base formulation so that a problem solution particularly tailored to the user's problem is determined.

Referring to FIGS. 5 through 12, embodiments of a number of administrator interfaces or webpages are illustrated for configuring problem solutions for the solution service. With the benefit of the present disclosure, it will be appreciated that the administrator can define a number of other details of the service not explicitly shown in the present FIGS. 5 through 12.

As noted above, the administrator can enter information on one or more fluid sources for selection by the user. Referring to FIG. 5, an embodiment of an interface or webpage 500 for adding a water source to the solution service is illustrated. The interface 500 includes a field 510 for naming the fluid source and includes a plurality of text fields 520 for entering values for the fluid source. The values for these fields 520 define the characteristics of the fluid source and can be measured in the field or already known. In the present example, the fields 520 include calcium hardness, conductivity, M alkalinity, magnesium level, pH level, silica, total hardness, total solids, and turbidity. Depending on the type of solution and systems to be analyzed with the solution service, the characteristics of the fluid sources may be different and may require different values than those shown in the present example. After entering information in the interface 600, the administrator selects "Save" 530 to store the information in the databases of the solution service.

Figure 6:
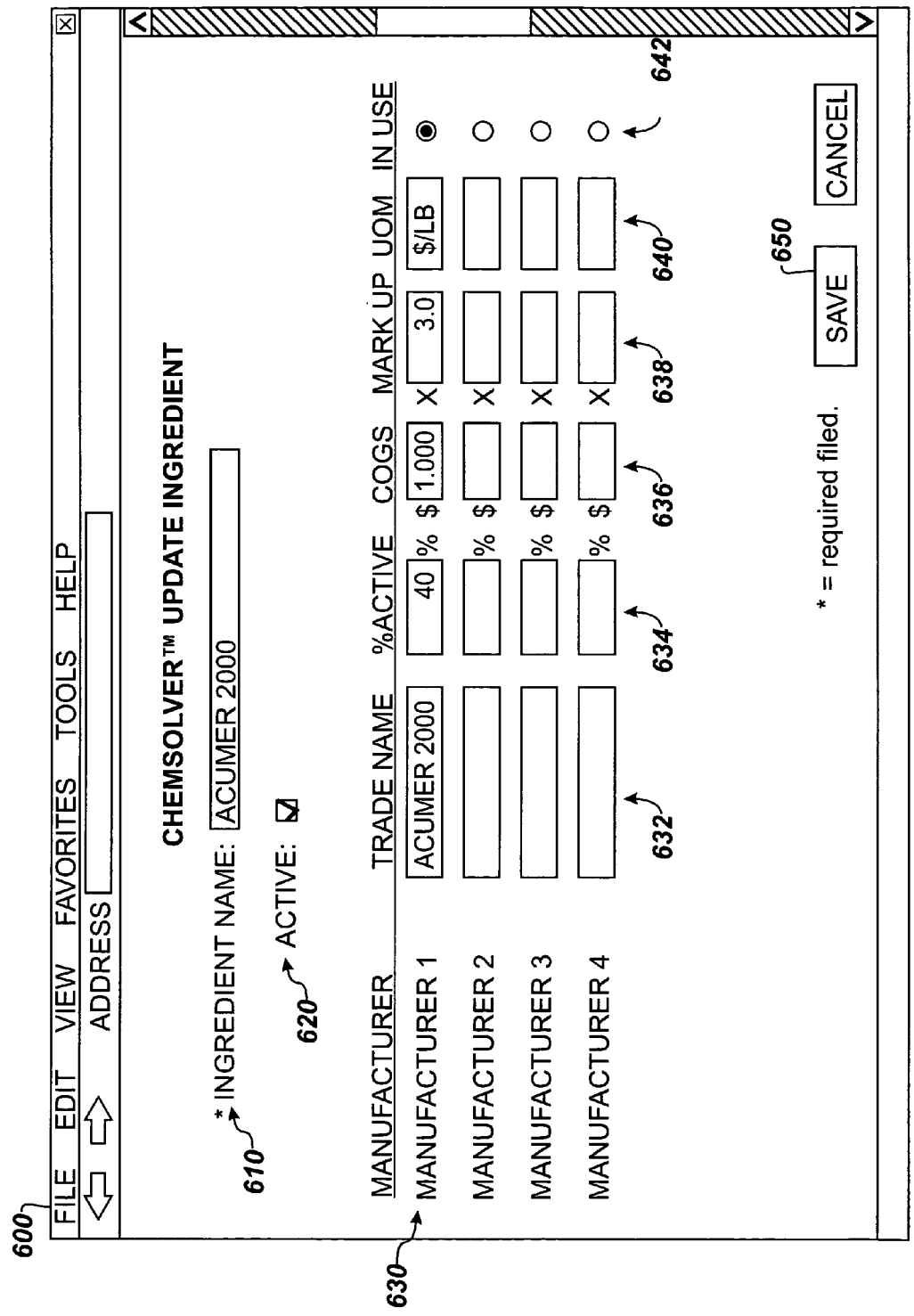
FIG. 6 illustrates an embodiment of an interface for adding ingredients for raw material manufactures.

As noted above, the administrator enters information about chemical ingredients or constituents used to treat fluid system problems. Referring to FIG. 6, an embodiment of an interface or webpage 600 for adding/updating ingredients for raw material manufactures is illustrated. The administrator enters a name of an ingredient in field 610 and designates whether the ingredient is active 620 for determining problem solutions by the solution service. The interface 600 also includes a list 630 of various manufactures. The administrator enters a trade name 632 for the ingredient, the percentage that the ingredient is active 634, the cost of goods sold (COGS) 636, the mark-up 638, the unit-of-measure (UOM) 640, and whether the ingredient is in use 642. The interface 600 could be reversed in its arrangement so that a particular manufacturer is named and various ingredients from that one particular manufacturer are input with information. The values entered in fields 634 through 640 are used to determine costs and other aspects of the ingredient when it is part of a problem solution found by the solution service as disclosed herein. For example, the percent active 634 is used to define the concentration of the particular ingredients 632. Because various manufactures may offer the same ingredient with different concentrations, using the percent active 364 when determining solutions and costs helps ensure that appropriate amounts of a given ingredient from a manufacturer will be used in the solution. After entering information in the interface 600, the administrator selects "Save" 640 to store the information in the databases of the solution service.

Figure 7:
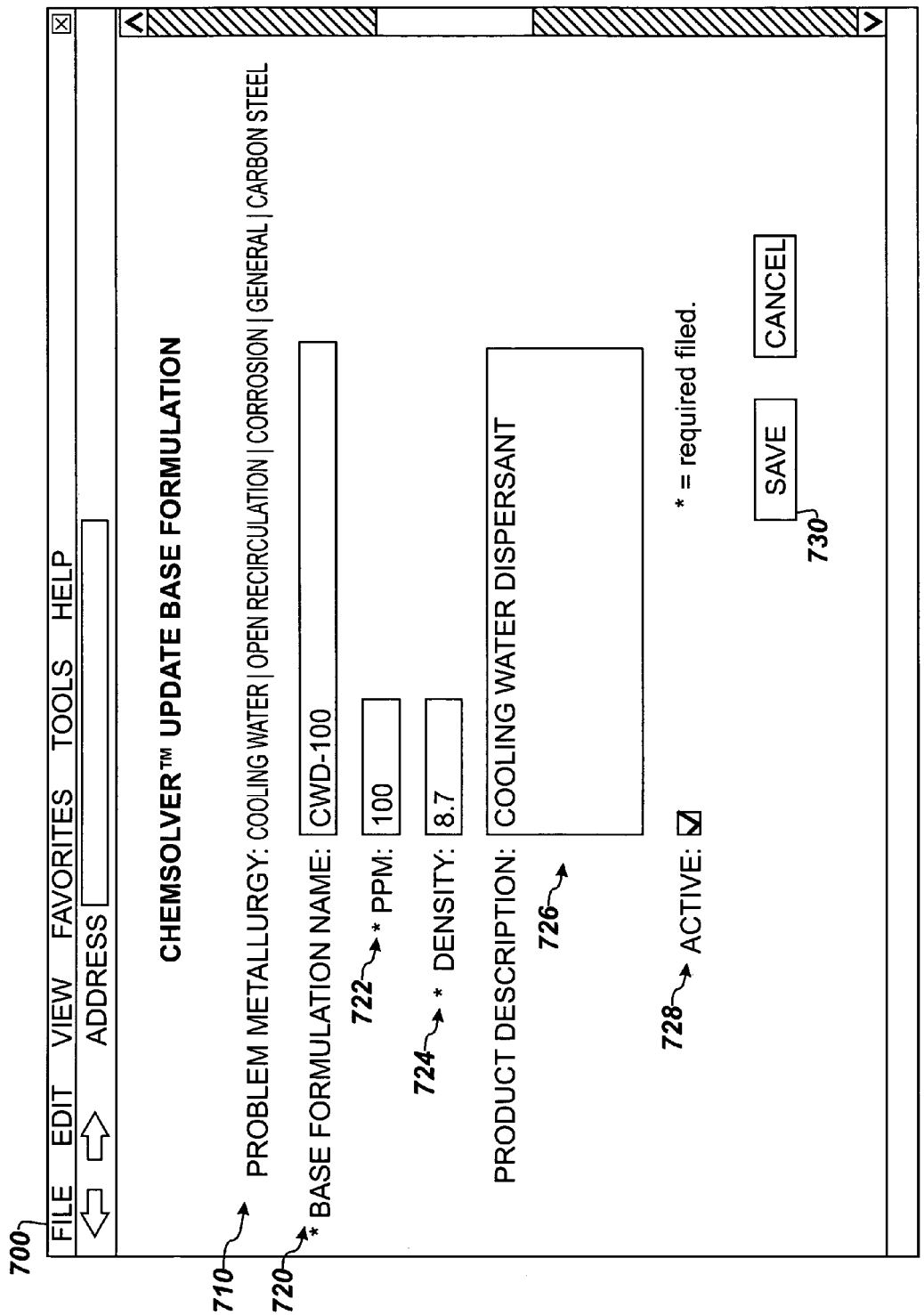
FIG. 7 illustrates an embodiment of an interface for adding a base formulation.

As noted above, the administrator enters information for a base formulation. Referring to FIG. 7, an embodiment of an administrator interface or webpage 700 for adding/updating a base formulation is illustrated. The base formulation to be entered by the administrator is associated with problem metallurgy 710, which is part of the problem hierarchy constructed by the administrator. In the present example, the problem metallurgy 710 is "carbon steel" and fits within the problem hierarchy of "cooling water/open recirculation/corrosion/general." The interface 700 includes fields 720 for naming the base formulation for the selected problem metallurgy 710. The interface 700 also includes a field 722 for entering the parts-per-million (PPM) for the base formulation, a field 724 for entering the density of the base formulation, a field 726 for entering a product description, and a field 728 for indicating whether the base formulation is active for use in determining solutions for user's problems. The actual chemical ingredient(s) that make-up the base formulation named in field 720 are entered using interface 1000 of FIG. 10, which is discussed later in the present disclosure. After entering information in the interface 700, the administrator selects "Save" 730 to store the information in the databases of the solution service.

Figure 8:
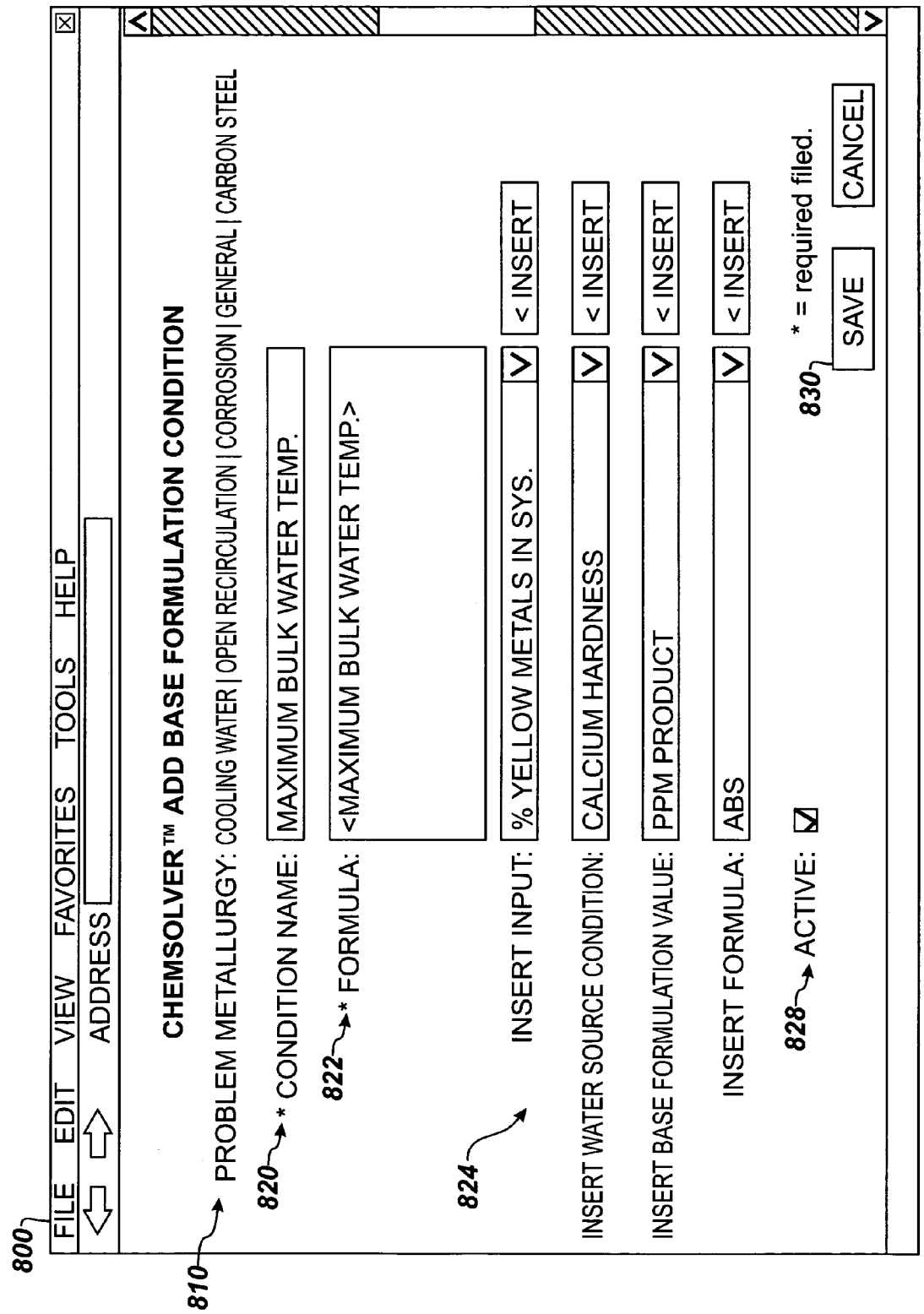
FIG. 8 illustrates an embodiment of an interface for adding a condition of a base formulation.

As noted above, the administrator enters information for a condition of a base formulation. When the condition is satisfied, the base formulation becomes part of the problem solution for the user of the solution service. Referring to FIG. 8, an embodiment of an interface or webpage 800 for adding a condition for a base formulation is illustrated. This interface 800 is accessed after a base formulation is defined with the interface of FIG. 7. The condition for the base formulation to be entered by the administrator is associated with a problem metallurgy 810, which is part of the problem hierarchy constructed by the administrator. In the present example, the problem metallurgy 810 is again "carbon steel" and fits within the hierarchy of "cooling water/open recirculation/corrosion/general."

The interface 800 includes a field 820 for naming a condition, a field 822 for entering a formula for the condition, and various fields 824 for inserting variables in the formula 822. In the present example, the condition is "maximum bulk water temperature". The variables for insertion into the formula can include information on the water system (e.g., % Yellow Metals in System), the water source condition (e.g., calcium hardness), and the base formulation value (e.g., PPM). The variables in fields 824 come from the configuration of the solution service in other interfaces discussed herein. In addition, a general formula configured by the administrator can also be inserted into the formula 822 from fields 824. Furthermore, the administrator can indicate whether the condition for the base formulation is active for determining problem solutions using field 828. After entering information in the interface 800, the administrator selects "Save" 830 to store the information in the databases of the solution service.

As noted above, the administrator enters information for results of a condition associated with a base formulation. When the condition for the base formulation is met, the result is then used to re-configure the base formulation. Referring to FIG. 9, an embodiment of an interface or webpage 900 for adding a result for a condition of a base formulation is illustrated. This interface 900 is accessed after a condition 912 of a base formulation 910 is defined the interface of FIG. 8. In the present example, the condition is "Maximum Bulk Water Temperature," which is associated with the base formulation "CWD-100" as part of the hierarchy of "cooling water/open recirculation/corrosion/general/carbon steel."

The interface 900 includes a field 920 for naming a result for the selected condition, a field 922 for indicating an operator for relating that result 920 to a formula, and a field 924 for entering a formula. In addition, the interface 900 includes various fields 926 for inserting variables, such as system information, water source conditions, and general formulas, into the formula 924 for the result 920. In the present example, the condition is maximum bulk water temperature, and the result is "greater than 120 Deg F." The condition result is related to the value "119.4" in the formula field 924 by the operator ">". Thus, if the maximum bulk temperature of the user's fluid system is greater than 119.4° F., for example, aspects of the problem solution (such as the amount or concentration of an ingredient associated with this condition result of a base formulation) may be altered. After entering information in the interface 900, the administrator selects "Save" 930 to store the information in the databases of the solution service.

Figure 10:
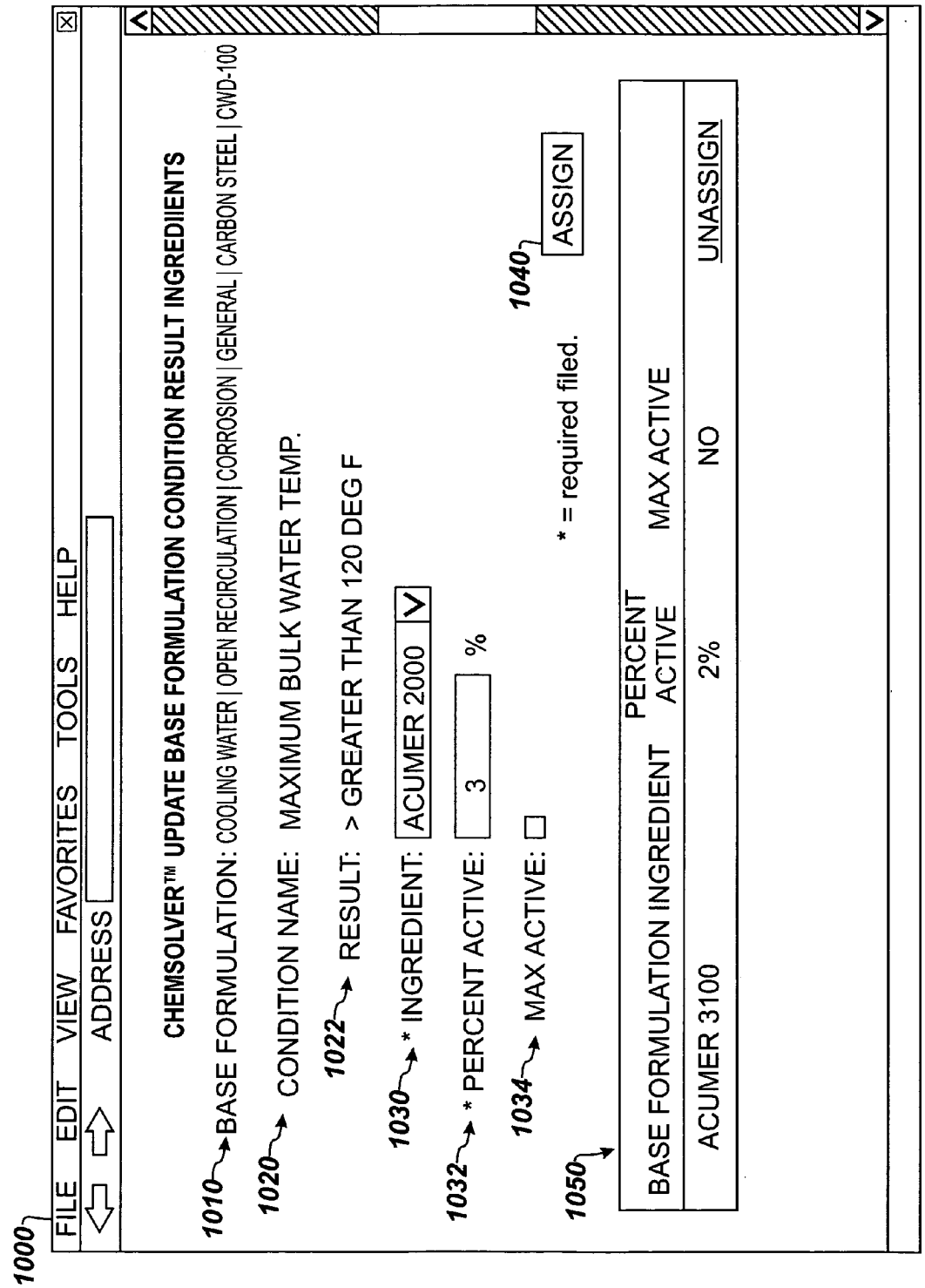
FIG. 10 illustrates an embodiment of an interface for adding ingredients when a result of a condition for a base formulation is met.

As noted above, the administrator enters information for ingredients for a result of a condition result associated with a base formulation. The ingredients form part of the problem solution given to a user when using the solution service. Referring to FIG. 10, an embodiment of an interface 1000 for adding/updating ingredients for a result of a condition associated with a base formulation is illustrated. This interface 1000 is accessed after a result is defined in the interface of FIG. 9. The interface 1000 shows the base formulation 1010, the previously entered base condition 1020, and the result 1022 with operator. In the present example, the condition 1020 is "Maximum Bulk Water Temperature," and the result 1022 is ">greater than 120 degrees."

The interface 1000 includes a field 1030 for selecting a base formulation ingredient governed by the result 1022, a field 1032 for entering the percent of the ingredient that is active, and a field 1034 for indicating whether the percent active is the maximum amount. Selections for the base formulation ingredient 1030 are provided in a drop-down and are populated by the ingredients entered with the interface in FIG. 6, described above. The interface 1000 shows a table 1050 with the ingredient(s) already associated with the current result of the condition for the base formulation. After entering information in fields 1030-1034, the administrator selects "Assign" 1040 to assign the entered ingredient and concentration with those already assigned in the table 1050. Thus, in the present example, the assigned ingredient(s) (e.g., Acumer 2000 and Acumer 3100) and their concentrations will be applied to the solution if the maximum bulk temperature (condition in field 1020) of the user's fluid system is greater than 119.4° F. (result in field 1022 and as configured in the interface of FIG. 9).

As noted above, the administrator enters information for calculating annual costs of ingredients of a problem solution. Referring to FIG. 11, an embodiment of an interface or webpage 1100 for adding/updating annual costs for a selected base formulation is illustrated. This interface 1100 is accessed after the base formulation is defined in the interface of FIG. 700. The interface 1100 shows the base formulation 1110 and its position in the problem hierarchy. The interface 1100 includes a field 1120 for naming the annual cost (e.g., "Product Cost"), a field 1122 for indicating the unit of measure (e.g., "$/day") for the annual cost, and a field 1124 for entering a formula for calculating the annual cost. The interface 1100 also includes for various fields 1126 for inserting variables (e.g., system inputs, water source conditions, operating parameters, control targets, min/max targets, base formulation value, and general formula) into the cost formula 1124. In general, the cost analysis uses two components to calculate the cost of a problem solution. The first component of the cost is the stored price of the ingredient, and the second component is any added pricing due to required concentrations of the ingredient (e.g., if the user's fluid system has a high recirculation rate). After entering information in the interface 1100, the administrator selects "Save" 1130 to store the information in the databases of the solution service.

Figure 12:
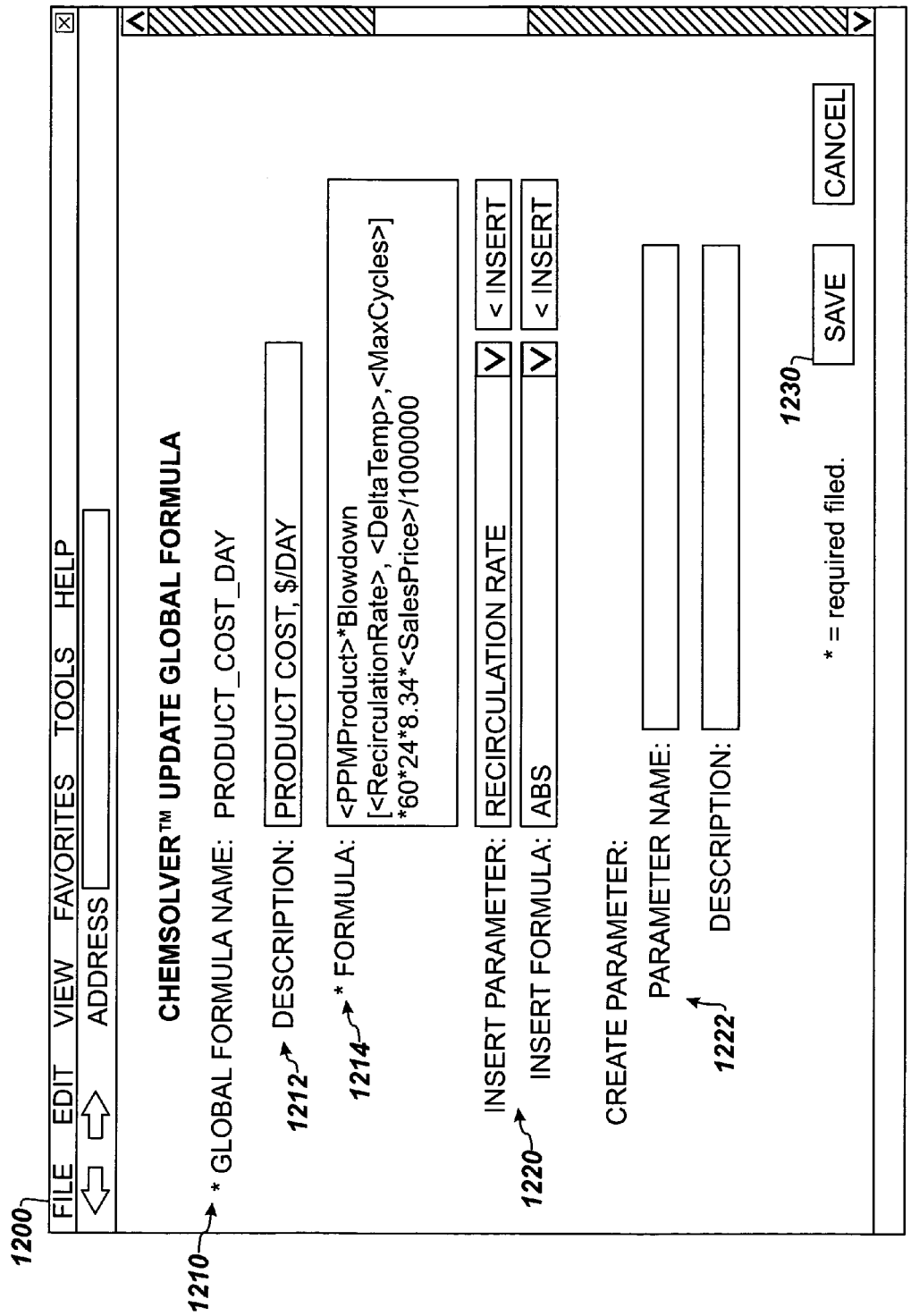
FIG. 12 illustrates an embodiment of an interface for adding a global formula for use elsewhere in the solution service.

As noted above, the administrator can enter formulas for performing analysis and calculations. Referring to FIG. 12, an embodiment of an interface 1200 for adding/updating a global formula for use with other interfaces in the solution service is illustrated. The interface 1200 includes a field 1210 for naming the formula, a field 1212 for describing the formula, and a field 1214 for entering a formula. In addition, the interface 1200 includes various fields 1220 for inserting parameters (e.g., recirculation rate) and standard formulas into the formula field 1214. Furthermore, the interface 1200 includes fields 1222 for creating parameters for the formula field 1214. After entering information in the interface 1200, the administrator selects "Save" 1230 to store the information in the databases of the solution service.

Now that aspects of the solution service associated with the configuration of problem solutions by an administrator have been discussed, the present disclosure now focuses on aspects of how a user accesses the pre-configured problem solutions to determine a solution that is well-tailored for their particular problem and fluid system.

Figure 13:
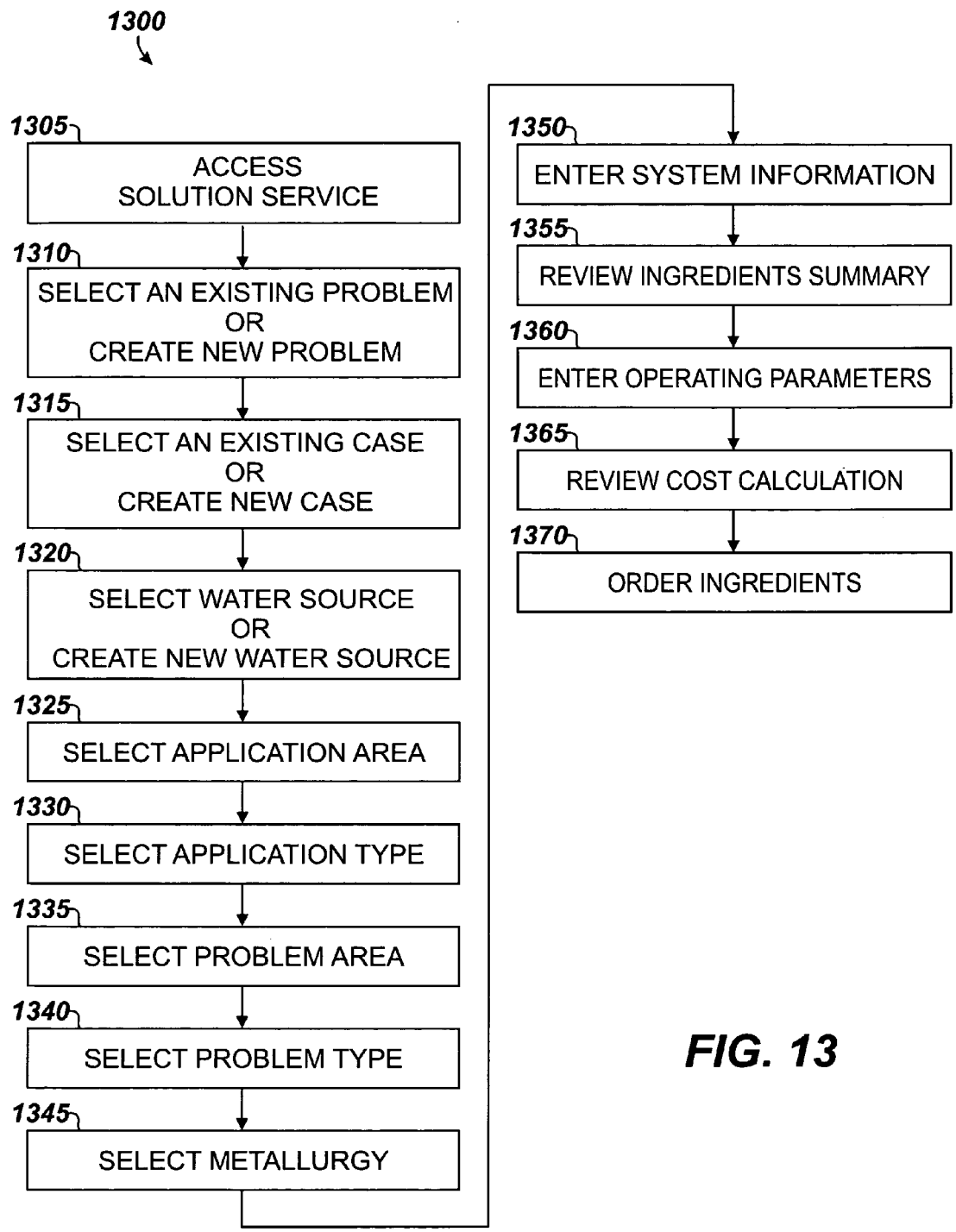
FIG. 13 illustrates a flowchart showing acts performed by a user when using the disclosed solution service to solve a problem the user has encountered with their water system.

FIG. 13 illustrates a flowchart showing actions 1300 performed by a user when using the disclosed solution service to solve a problem the user has encountered with their fluid system. The user accesses the solution service via the Internet (Block 1305). From the interfaces or web pages associated with the user's account, the user selects an existing entry of a problem or creates a new entry for a problem (Block 1310). The existing problem can be one already entered by the user or another user associated with the user's account. The existing problem, for example, may refer to a test or the like preformed at a company in which a problem was discovered and a solution is being sought.

Next, the user selects an entry of a case associated with a problem or creates an entry for a new case (Block 1315). A case can be a label used by the user to keep track of their various problems and solutions. After naming the problem and case, the user selects a water source for the system associated with the problem for which they are seeking a solution (Block 1320). The water sources available on the user's interface corresponds to one already entered by an administrator, another user, or the present user. If the actual water source for their system is not available, the user can enter a new water source. This requires the user to enter a description of the water source and values for characteristics of the water source using an interface similar to the disclosed above with reference to FIG. 5.

With the details of the water source for their system selected, the user selects a plurality of user-selectable options in the hierarchy configured by the administrator to arrive at a solution for their problem. Through a series of interfaces, the user selects an application area, an application type, a problem area, a problem type, and metallurgy of a pre-configured hierarchy. As noted above, an administrator pre-configures the hierarchy so that the user can arrive at a base formulation that is suited for addressing their problem and system.

After selecting an existing problem or entering a new problem, various application areas within the hierarchy associated with the selected problem will be presented to the user. The user selects one of the application areas (e.g., cooling water) that fits their problem (Block 1325). Depending on the area selected, various application types within the hierarchy associated with the selected area will be presented to the user. The user selects an application type (e.g., open recirculation) that fits their problem (Block 1330). Depending on the type selected, various problem areas within the hierarchy associated with the selected type will be presented to the user. The user selects a problem area (e.g., corrosion) that fits their problem (Block 1335). Depending on the problem area selected, various problem types within the hierarchy associated with the selected problem area will be presented to the user. The user then selects a problem type (e.g., galvanic) that fits their problem (Block 1340). Finally, depending on the problem type selected, various metallurgies within the hierarchy associated with the selected problem type will be presented to the user. The user then selects a metallurgy (e.g., carbon steel/admiralty) that fits their problem (Block 1345).

After the user performs the actions of Blocks 1305 to 1345, the solution service has reached a base formulation that has been pre-configured in the solution service by the administrator to fit the user's selections of application area, application type, problem area, problem type, and metallurgy. The user then enters information about their system (Block 1350). The system information will typically include values that will be necessary for reconfiguring the amounts and inclusion of various ingredients in the pre-configured base formulation. The solution service then reconfigures the ingredients in the pre-configured base formulation so that the problem solution meets the needs of the user's system. The reconfigured solution is then displayed in the form of a summary for review by the user (Block 1355).

Next, the user enters operating parameters for their system (Block 1360). The operating parameters typically include values for temperatures, circulation rates, etc. The operating parameters are used to calculate the annual cost of the ingredients in the re-configured base formulation. The solution service then displays a cost calculation for the ingredients in the re-configured base formulation for review by the user (Block 1365). Based on their review, the user can order quantities of the ingredients in the re-configured base formulation from the solution service (Block 1370).

Now that the actions of the user for the solution service have been described, interfaces or webpages of the solution service used by the user will be discussed. Referring to FIGS. 14 through 18, embodiments of a number of user interfaces or web pages are illustrated for a user of the solution service. With the benefit of the present disclosure, it will be appreciated that the user can have access to a number of interfaces not explicitly shown in the present FIGS. 14 through 18.

As noted above, the user must define the problem with their water system when accessing the solution service. Defining the problem involves selecting or creating a problem, selecting or naming a case, selecting or creating a water source, and selecting options of a problem hierarchy configured by the administrator. Referring to FIG. 14, an embodiment of a user interface or webpage 1400 is illustrated for the user to configure or define their problem. This interface 1400 shows the result of the user after entering the subsequent actions of Blocks 1310 to 1345 detailed above in FIG. 13. The interface 1400 uses the water sources, application areas, application types, problem areas, problem types, and metallurgy, which were configured by the administrator. The user makes selections in each field 1410, 1420, 1430, etc., in turn. After each selection by the user, the interface 1400 is refreshed to show the user's selection and to display the next available selections in the next field of the pre-configured hierarchy of selections.

For example, the user selects or enters a problem in field 1410, the user selects or enters a case in field 1420, and the user selects or enters a water source in field 1430. To enter a water source, the user accesses an interface similar to that shown in FIG. 5. After making these selections 1410, 1420, and 1430, the user selects an application area (e.g., cooling water) in field 1440. Based on the selection of application area, the interface 1400 is refreshed to display selections for the application type of field 1450, which correspond to the pre-configured hierarchy associated with the selected application area in field 1440. Based on the selection of application type (e.g., open recirculating) in field 1440, the interface 1400 is refreshed to display selections for the problem area of field 1460, which correspond to the pre-configured hierarchy associated with the selected application type in field 1450. This process of selecting and refreshing is continued until the user has made selections in the remaining fields 1470 and 1480, which results in the display of the interface as shown in FIG. 14. After configuring their problem, the user selects "Continue" 1490 to access the next interface, which is discussed below in FIG. 15.

As noted above, the user must enter information or parameters about their system after configuring or defining their problem in the solution service. At this point in the analysis, the solution service has already determined a base formulation associated with the particular selections made by the user in the problem hierarchy. However, various parameters, conditions, and results determine whether certain ingredients or whether certain amounts of ingredients are to be used in the ultimate solution for the user's problem.

Referring to FIG. 15, an embodiment of an interface or webpage 1500 is illustrated for the user to enter information or parameters about their system. The interface 1500 includes a summary 1510 of the problem previously defined by the user. The interface 1500 also includes fields 1520 for the user to enter information or parameters about their system. As discussed above, what information or parameters are requested from the user in this interface 1500 depends on the pre-configured problem solution in the solution service. In the present example of fields 1520, the user is asked to enter the "% Yellow Metals" in the system, whether the system has clarified make-up water, what the maximum bulk water temperature is for the system, and whether the system has pH control. The information entered in fields 1520 is used by the solution service to re-configure the ingredients of the base formulation, which has already been determined based on the user's defining or configuration of the problem in the interface of FIG. 14. The current interface 1500 also allows the user to attach support files and other information to the system information in fields 1530. Once completed, the user selects a "Continue" button (not shown) on the interface 1500 to access the next interface, which is discussed below in FIG. 16.

Figure 16:
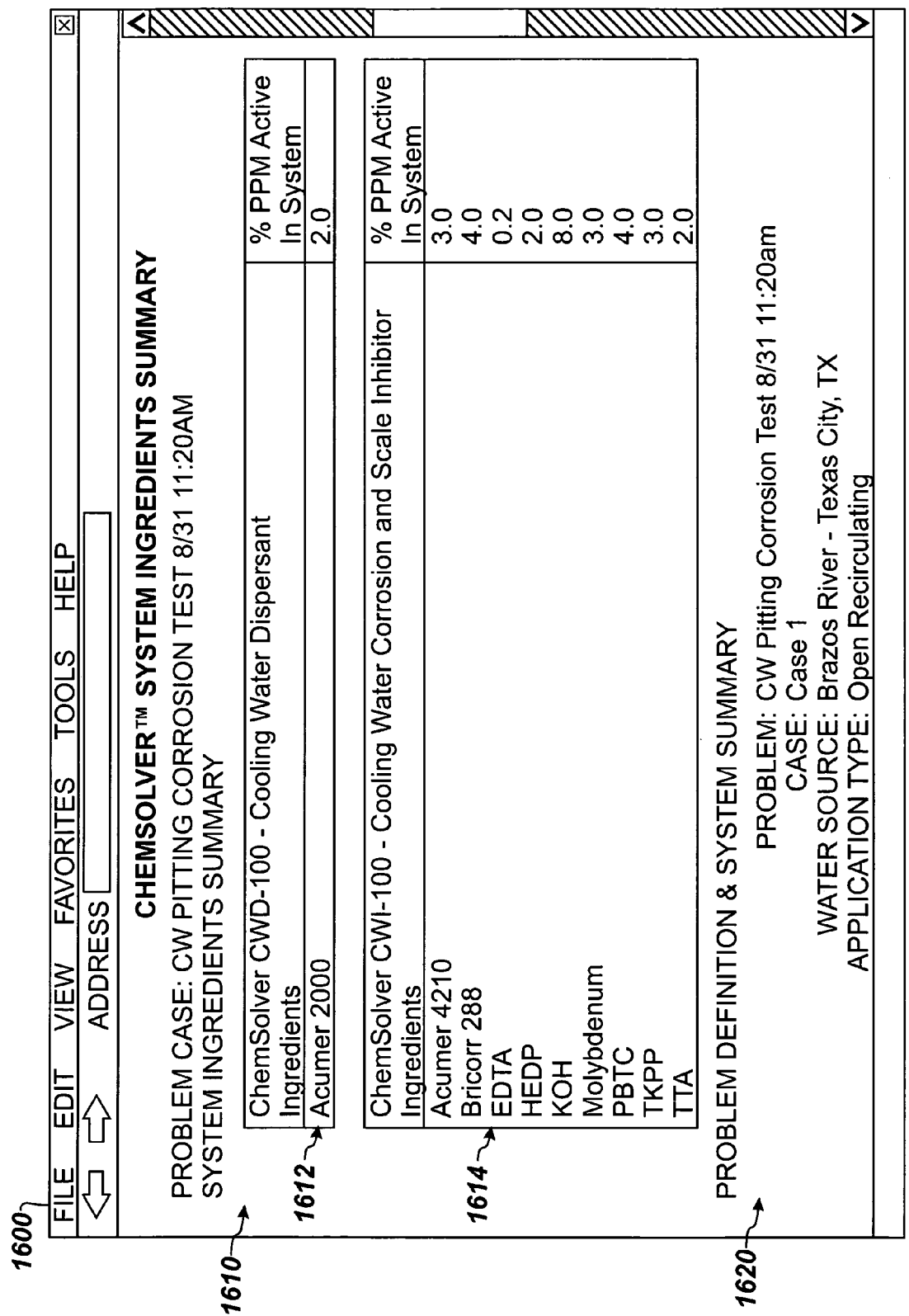
FIG. 16 illustrates an embodiment of an interface for the user to review system ingredients for a problem solution.

After system information has been entered, the solution service determines the ingredients and quantities of the ingredients for the base formulation associated with the problem and the system information defined by the user. Referring to FIG. 16, an embodiment of an interface or webpage 1600 is illustrated, which shows a summary 1610 of the base formulations 1612 and 1614 determined for the user's problem. In the present example, two base formulations (CWD-100) 1612 and (CWI-100) 1614 have been determined as solutions for the user's water system problem. Each base formulation 1612 and 1614 in the summary 1610 details the one or more ingredients for treating the user's problem. The one or more ingredients of each base formulation 1612 and 1614 are shown with its name and its percent active. The interface 1600 also includes a summary 1620 of the problem and system. Once reviewed, the user selects a "Continue" button (not shown) on the interface 1600 to access the next interface, which is discussed below in FIG. 17.

As noted above, after determining the base formulation for the problem solution, the user enters operating parameters, and the solution service calculates the cost for the user. Referring to FIG. 17, an embodiment of a user interface or webpage 1700 is illustrated for entering operating parameters. The interface 1700 includes a plurality of fields 1710 for the user to enter operating parameters of the user's system. As discussed above, what operating parameters are requested from the user in this interface 1700 depends on the pre-configured problem solution in the solution service. In the present example of fields 1710 in the interface 1700, the user is asked to enter the temperature difference between return and supply in the system and the recirculation rate in the system. The fields 1710 also allow the user to specify the blending and packaging of ingredients the user wishes to use in treating their system and to indicate whether the user wishes to include the case in the cost calculation of the ingredients of the problem solution. The interface 1700 also provides a summary 1720 of previously entered information.

As noted previous, the base formulation has already been determined based on the user's configuration of the problem in the interface 1400 of FIG. 14 and based on the system information entered in the interface 1500 of FIG. 15. The operating parameters and information entered in fields 1710 are used by the solution service to determine the cost for the re-configured ingredients of the base formulation. Once completed, the user selects a "Continue" button (not shown) on the interface 1700 to access the next interface, which is discussed below in FIG. 18.

Figure 18:
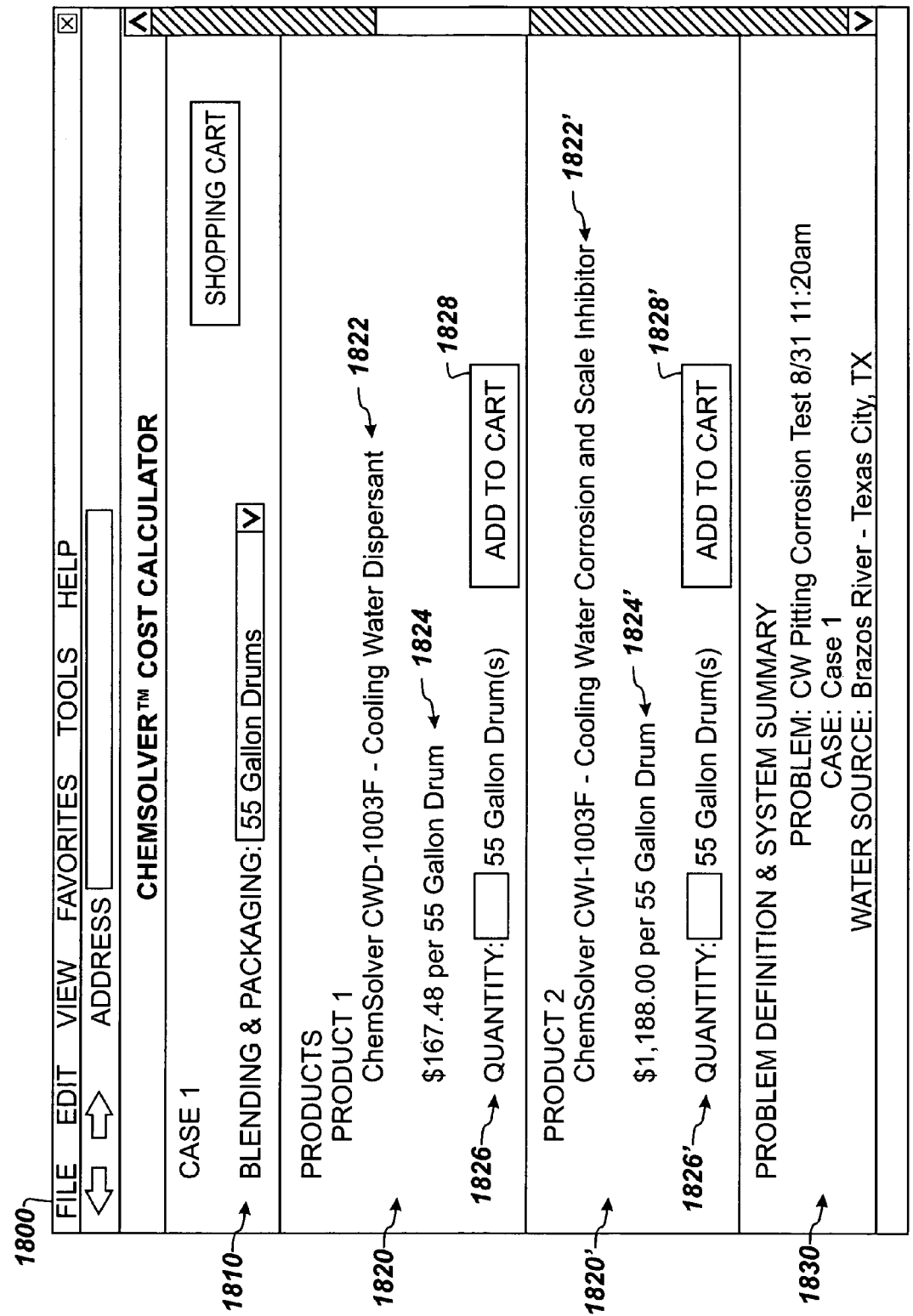
FIG. 18 illustrates an embodiment of an interface for the user to review the calculated cost of the ingredients and to order quantities of the ingredients.

Referring to FIG. 18, an embodiment of a user interface or webpage 1800 is illustrated for displaying results of cost analysis and for ordering chemical ingredients for the treatment solution. The interface 1800 includes a field 1810 for the user to designate the blending and packaging they desire for the chemical ingredients for the treatment solution. The available blending and packaging of chemical ingredients found in a solution are pre-configured by the administrator when defining treatment solutions within the solution system. Accordingly, an administrator defines the blending and packaging using an administrator interface (not shown) before the user has accessed the solution service to find a solution.

In the present example, the user has selected to calculate costs based on "55 Gallon Drums" of the ingredients. The interface 1800 also includes one or more fields 1820 and 1830 for the base formulations for the problem solution. Each field 1820 lists the chemical ingredient or product 1822 and the price 1824 of the product per selected blending and packaging. Each field 1820 also allows the user to select a quantity 1826 for each product. The Internet website of the solution service includes aspects of an Internet shopping cart known in the art so that the user can select a quantity of a product to add to a purchasing cart 1828 of the solution service. Therefore, the interface 1800 shows the price of the products determined by the solution service to treat the problem the user has with their system and allows the user to purchase quantities of those products from the solution service.

The present disclosure amply illustrates to a computer programmer of skill how to make and use the disclosed adaptive techniques for handling notifications and the accompanying user interfaces and other functional aspects. Therefore, programming such techniques, accompanying user interfaces, and other functional aspects is a routine matter to a computer programmer of skill and can be accomplished using many different programming languages and within the context of many different operating systems. Of course, the disclosed techniques would be ultimately coded into a computer code and stored on a computer-readable media, such as a compact disk, a tape, stored in a volatile or non-volatile memory, etc.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. For users having fluid systems with problems treatable by chemical constituents, a method of providing the users with solutions at a server having a database, the database storing information on a plurality of chemical constituents, the method comprising:
  defining a pre-configured solution for chemically treating a problem associated with a fluid system by configuring a plurality of options for selection by a user at the server, the pre-configured solution comprising one or more of the chemical constituents stored in the database;
  storing the pre-configured solution and the options in the database;
  receiving a plurality of selections from a user at the server;
  creating a treatment solution that associates the user's problem with the pre-configured solution by matching the selections from the user with the options of the pre-configured solution in the database; and
  providing the treatment solution to the user.

2. The method of claim 1, further comprising:
  receiving one or more parameters from the user at the server; and
  re-configuring the chemical constituents in the pre-configured solution based on the one or more parameters from the user.

3. The method of claim 2, wherein the act of re-configuring the chemical constituents comprises determining whether a condition governing a base formulation of chemical constituents is met based on the parameters from the user.

4. The method of claim 3, wherein the act of re-configuring the chemical constituents comprises determining which result for the met condition to apply based on the parameters from the user.

5. The method of claim 2, wherein the parameters received from the user at the server comprise operating parameters of the user's fluid system.

6. The method of claim 2, wherein the parameters received from the user at the server comprise selection of a desired packaging for the chemical constituents by the user.

7. The method of claim 2, wherein the act of re-configuring the chemical constituents comprises adjusting a quantity of a chemical constituent based on the parameters.

8. The method of claim 2, wherein the act of re-configuring the chemical constituents comprises determining an annual cost of the chemical constituents in the re-configured solution.

9. The method of claim 1, wherein the act of configuring the plurality of options for selection by the user comprises constructing a hierarchy of the plurality of options for selection by the user at the server to define their system and problem.

10. The method of claim 9, wherein the hierarchy of the plurality of options includes one or more application areas for fluid systems, one or more types of fluid system for each application area, one or more problem areas for each type of fluid system, one or more types of problems for each problem area, and one or more metallurgies for each type of problem.

11. The method of claim 9, wherein the act of constructing the hierarchy of the plurality of options comprises defining one or more base formulations of chemical constituents for chemically treating the problem.

12. The method of claim 1, wherein the act of configuring the plurality of options for selection by the user comprises defining one or more predetermined fluid sources for selection by the user.

13. The method of claim 1, wherein the act of receiving the selections from the user at the server comprises offering one or more user interfaces at the server for presenting the options to the user and for receiving the selections of the options from the user.

14. The method of claim 1, further comprising offering chemical constituents of the treatment solution for purchase by the user at the server.

15. A computer readable medium having instructions executable at a server having a database, the instructions performing a method of providing solutions to users having fluid systems with problems treatable by chemical constituents, the database storing information on a plurality of chemical constituents, the method comprising:
defining a pre-configured solution for chemically treating a problem associated with a fluid system by configuring a plurality of options for selection by a user, the pre-configured solution comprising one or more of the chemical constituents stored in the database;
storing the pre-configured solution and the options in the database;
receiving a plurality of selections from a user at the server; creating a treatment solution that associates the user's problem with the pre-configured solution by matching the selections from the user with the options of the pre-configured solution in the database; and
providing the treatment solution to the user.

16. The computer readable medium of claim 15, further comprising:
receiving one or more parameters from the user at the server; and
re-configuring the chemical constituents in the pre-configured solution based on the one or more parameters from the user.

17. The computer readable medium of claim 16, wherein the act of re-configuring the chemical constituents comprises determining whether a condition governing a base formulation of chemical constituents is met based on the parameters from the user.

18. The computer readable medium of claim 17, wherein the act of re-configuring the chemical constituents comprises determining which result for the met condition to apply based on the parameters from the user.

19. The computer readable medium of claim 16, wherein the parameters received from the user at the server comprise operating parameters of the user's fluid system.

20. The computer readable medium of claim 16, wherein the parameters received from the user at the server comprise selection of a desired packaging for the chemical constituents by the user.

21. The computer readable medium of claim 16, wherein the act of re-configuring the chemical constituents comprises adjusting a quantity of a chemical constituent based on the parameters.

22. The computer readable medium of claim 16, wherein the act of re-configuring the chemical constituents comprises determining an annual cost of the chemical constituents in the re-configured solution.

23. The computer readable medium of claim 15, wherein the act of configuring the plurality of options for selection by the user comprises constructing a hierarchy of the plurality of options for selection by the user at the server to define their system and problem.

24. The computer readable medium of claim 23, wherein the hierarchy of the plurality of options includes one or more application areas for fluid systems, one or more types of fluid system for each application area, one or more problem areas for each type of fluid system, one or more types of problems for each problem area, and one or more metallurgies for each type of problem.

25. The computer readable medium of claim 23, wherein the act of constructing the hierarchy of the plurality of options comprises defining one or more base formulations of chemical constituents for chemically treating the problem.

26. The computer readable medium of claim 15, wherein the act of configuring the plurality of options for selection by the user comprises defining one or more predetermined fluid sources for selection by the user.

27. The computer readable medium of claim 15, wherein the act of receiving the selections from the user at the server comprises offering one or more user interfaces at the server for presenting the options to the user and for receiving the selections of the options from the user.

28. The computer readable medium of claim 15, further comprising offering chemical constituents of the treatment solution for purchase by the user at the server.

29. For users having fluid systems with problems treatable by chemical constituents, an automated solution system for users, comprising:
one or more databases for storing information for a plurality of chemical constituents; and
a server associated with the one or more databases and configured to:
configure a plurality of options for selection by a user at the server to define a pre-configured solution for chemically treating a problem associated with a fluid system, the pre-configured solution comprising one or more of the chemical constituents stored in the database,
store the pre-configured solution and the options in the one or more databases,
receive a plurality of selections from a user,
match the selections from the user with the options of the pre-configured solution to create a treatment solution that associates the user's problem with the pre-configured solution, and
provide the treatment solution to the user.

30. The system of claim 29, wherein the server is further configured to:
receive one or more parameters from the user at the server; and
re-configure the chemical constituents in the pre-configured solution based on the one or more parameters from the user.

31. The system of claim 30, wherein to re-configure the chemical constituents, the server is configured to determine whether a condition governing a base formulation of chemical constituents is met based on the parameters from the user.

32. The system of claim 31, wherein to re-configure the chemical constituents, the server is configured to determine which result for the met condition to apply based on the parameters from the user.

33. The system of claim 30, wherein the parameters received from the user at the server comprise operating parameters of the user's fluid system.

34. The system of claim 30, wherein the parameters received from the user at the server comprise selection of a desired blending of chemical constituents by the user.

35. The system of claim 30, wherein to re-configure the chemical constituents, the server is configured to adjust a quantity of a chemical constituent based on the parameters.

36. The system of claim 30, wherein to re-configure the chemical constituents, the server is configured to determine an annual cost of the chemical constituents in the re-configured solution.

37. The system of claim 29, wherein to configure the plurality of options for selection by the user, the server is configured to construct a hierarchy of the plurality of options for selection by the user at the server to define their system and problem.

38. The system of claim 37, wherein the hierarchy of the plurality of options includes one or more application areas for fluid systems, one or more types of fluid system for each application area, one or more problem areas for each type of fluid system, one or more types of problems for each problem area, and one or more metallurgies for each type of problem.

39. The system of claim 37, wherein to construct the hierarchy of the plurality of options, the server is configured to define one or more base formulations of chemical constituents for chemically treating the problem.

40. The system of claim 29, wherein to configure the plurality of options for selection by the user, the server is configured to define one or more predetermined fluid sources for selection by the user.

41. The system of claim 29, wherein to receive the selections from the user at the server, the server is configured to offer one or more user interfaces at the server for presenting the options to the user and for receiving the selections of the options from the user.

42. The system of claim 29, wherein the server is further configured to offer chemical constituents of the treatment solution for purchase by the user at the server.

* * * * *